US012712780B2

(12) United States Patent
Goodman et al.

(10) Patent No.: US 12,712,780 B2
(45) Date of Patent: Aug. 18, 2026

(54) COMMUNICATION WITH HIGH AVAILABLE CLUSTERS USING MESSAGE BUS TECHNOLOGY

(71) Applicant: Dell Products L.P., Round Rock, TX (US)

(72) Inventors: Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/930,359

(22) Filed: Oct. 29, 2024

(65) Prior Publication Data

US 2026/0121918 A1 Apr. 30, 2026

(51) Int. Cl.

| | |
|---|---|
| ***H04L 41/00*** | (2022.01) |
| ***H04L 12/40*** | (2006.01) |
| ***H04L 41/0806*** | (2022.01) |
| ***H04L 67/1001*** | (2022.01) |
| ***H04L 67/56*** | (2022.01) |
| ***H04L 67/563*** | (2022.01) |

(52) U.S. Cl.
CPC .... *H04L 41/0806* (2013.01); *H04L 12/40032* (2013.01); *H04L 41/30* (2013.01); *H04L 67/1001* (2022.05); *H04L 67/56* (2022.05); *H04L 67/563* (2022.05)

(58) Field of Classification Search
CPC ........... H04L 41/0806; H04L 12/40032; H04L 41/30; H04L 67/1001; H04L 67/56; H04L 67/563
See application file for complete search history.

(56) References Cited

U.S. PATENT DOCUMENTS

| | | | | |
|---|---|---|---|---|
| 11,159,625 | B1 * | 10/2021 | Vyas | H04L 67/141 |
| 2011/0099232 | A1 * | 4/2011 | Gupta | H04L 67/566<br>709/206 |
| 2022/0027081 | A1 * | 1/2022 | Bibby | G06F 3/0632 |
| 2022/0052972 | A1 * | 2/2022 | Chang | H04L 51/212 |
| 2022/0197728 | A1 * | 6/2022 | Kotalwar | H04L 12/40143 |
| 2024/0296180 | A1 * | 9/2024 | Jalagadugula | G06F 16/355 |

* cited by examiner

*Primary Examiner* — Abdulkader M Alriyashi
(74) *Attorney, Agent, or Firm* — WOMBLE BOND DICKINSON (US) LLP

(57) ABSTRACT

Methods and systems for managing operation of a deployment of data processing systems are disclosed. The operation may be managed by facilitating communication, using a message bus, between a high available cluster and a client system. The communication may be facilitated by receiving, by the message bus, an activity request from a client device of the client system. The message bus may then distribute the activity request based on a topic of the activity request to a leader cluster instance of the high available cluster. The leader cluster instance may receive the activity request from the message bus and perform the at least one command based on the activity request and/or distribute the activity request to at least one cluster instance to perform the at least one command.

20 Claims, 11 Drawing Sheets

COMMUNICATION WITH HIGH AVAILABLE CLUSTERS USING MESSAGE BUS TECHNOLOGY

FIELD

Embodiments disclosed herein relate generally to managing operation of a deployment of data processing systems. More particularly, embodiments disclosed herein relate to using a message bus to facilitate communication between a high available cluster and a client system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
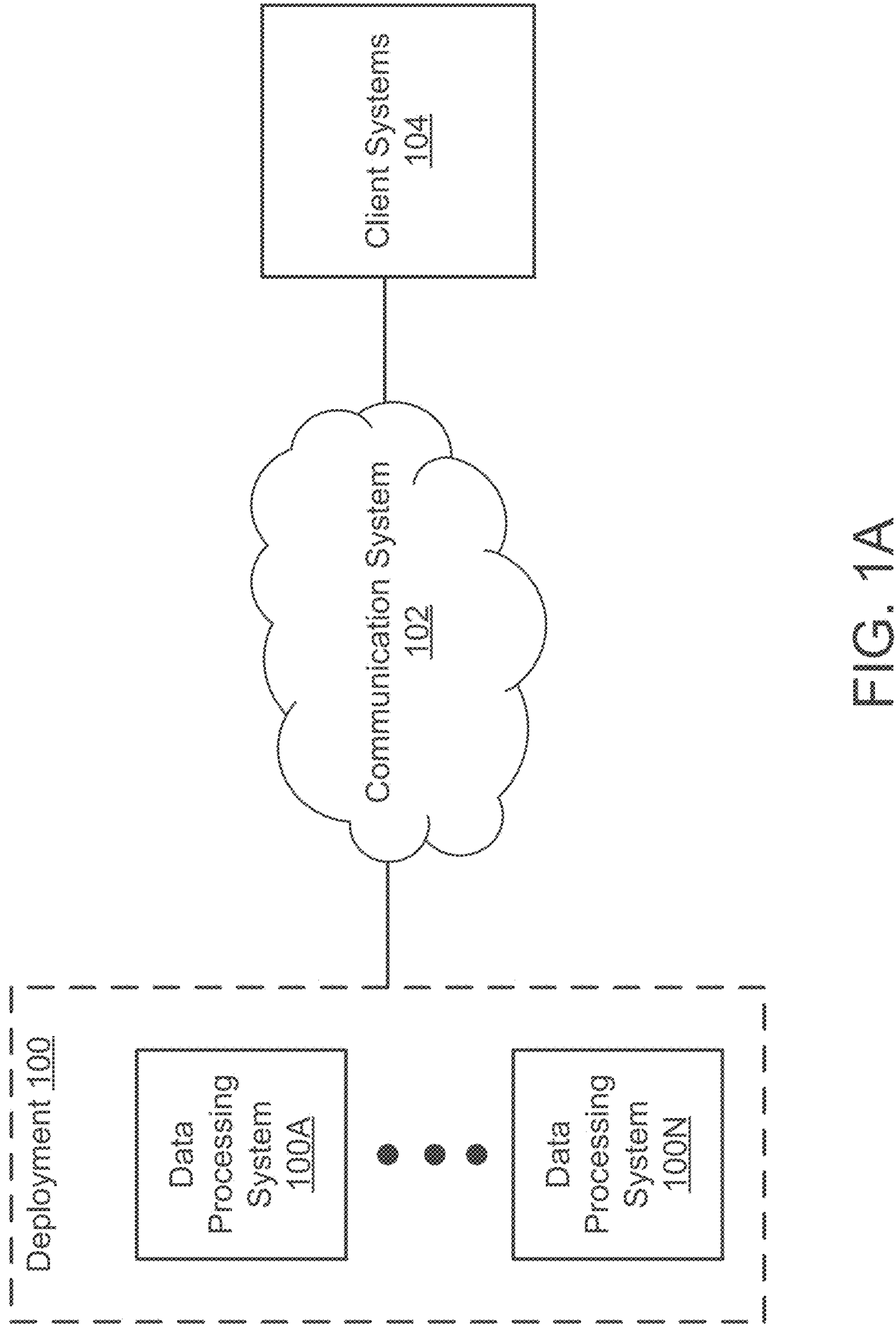
FIG. 1A shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a deployment of data processing systems. The operation may be managed by facilitating communication, by a message bus, between at least one cluster instance of a high available cluster and at least one client device of a client system.

The communication may be facilitated by sending, from the client device and to the message bus, an activity request. The activity request may include a request for performance of at least one command to provide computer implemented services. Further, between the client device and the message bus, a proxy may be used to send the activity request. The proxy may be used to simplify a configuration between the client device and the message bus.

The activity request may be received by the message bus. After receiving the activity request, the message bus may classify the activity request. The message bus may classify the activity request by associating the activity request with a topic classification. The message bus may then identify at least one subscriber to the topic classification. The at least one subscriber may include a leader cluster instance of the high available cluster.

Once the at least one subscriber is identified, the message bus may distribute the activity request to the at least one subscriber. The at least one subscriber, for example, the leader cluster instance, may receive the activity request and perform the at least one command and/or distribute the at least one command to at least one cluster instance managed by the leader cluster instance. Through performance of the at least one command and/or distribution of the at least one command, computer implemented services may be provided by the deployment.

In an embodiment, a method for managing operation of a deployment of data processing systems is disclosed. The method may include: (i) obtaining, by a message bus, an activity request from a client system, the activity request being for performance of a service by a high availability cluster, (ii) classifying, by the message bus, the activity request to obtain a topic classification for the activity request, (iii) identifying, by the message bus, subscribers to the topic classification, and (iv) distributing, by the message bus, the activity request to the subscribers to initiate the performance of the service by the high availability cluster.

The topic classification may be a leader topic, and a cluster instance of the high availability cluster is subscribed to the leader topic.

Each cluster instance of the high availability cluster may be adapted to only subscribe to the leader topic while the respective cluster instance of cluster instances elected as a leader of the high availability cluster.

The cluster instance may be an elected leader for the high availability cluster.

The high availability cluster may be adapted to perform a quorum to select leaders for the high availability cluster, and the high availability cluster is adapted to have a single leader at any point in time.

The method may include further (i) obtaining, by the message bus and from a newly added cluster instance of the high availability cluster, a cluster management subscription request and (ii) subscribing, by the message bus, the newly added cluster instance to a cluster management topic based on the cluster management subscription request.

The method may further include (i) obtaining, by the message bus and from the newly added cluster instance, a leader vote, (ii) classifying, by the message bus, the leader vote into a cluster management topic classification, (iii) identifying, by the message bus and based on the cluster management topic classification, the cluster management topic, (iv) identifying, by the message bus, the subscribers to the cluster management topic; and (v) distributing, by the message bus, the leader vote to the subscribers of the cluster management topic to facilitate an instance of a quorum to select a new leader for the high availability cluster. The method may further include (i) obtaining, by a proxy, the activity request and (ii) forwarding, by the proxy, the activity request to the message bus for processing by the high availability cluster.

The subscribers may include a first portion on a first sub-net and a second portion on a second sub-net, the first sub-net and the second sub-net being discontinuous.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, an activity request may be received from a client system. The client system may include a client device, such as a smartphone, a laptop, a personal computer, etc. The activity request may include at least one command to perform, by the deployment, a service to provide computer implemented services. The activity request may be received by sending the activity request, from the client system, through a communication system to a data processing system using an internet protocol (IP) address.

The activity request may be received by a cluster instance of the data processing system. The cluster instance may include a compute node that (i) ingests the activity request, (ii) authorizes the activity request, (iii) allocates resources to perform the activity request, and/or (iv) performs the at least one command.

However, the cluster instance may become unavailable due to, for example, (i) a change in the IP address, (ii) a network partition that isolates the cluster instance from at least a second cluster instance in the deployment, (iii) a failure in the cluster instance due to at least one hardware and/or software issue, (iv) at least one timeout, (v) latency, etc. Because the cluster instance becomes unavailable, the provision of the computer implemented services by the deployment may be impacted.

In general, embodiments disclosed here relate to systems and methods for operation of a deployment of data processing systems. The operation may be managed by facilitating distribution of an activity request to at least one subscriber to initiate performance of computer implemented services by the deployment. The activity request may include at least one command to perform, by at least one data processing system of the data processing systems. The at least one subscriber may include at least one cluster instance. The at least one cluster instance may be a compute node.

To facilitate the distribution of the activity request, the at least one cluster instance may be elected within a set of high available cluster instances. The at least one cluster instance may be elected by collecting, by a message bus, at least one vote from the at least one cluster instance. The at least one vote may be for a leader cluster instance of the at least one cluster instance. When a majority of the at least one vote has been collected for the leader cluster instance, then the leader cluster instance may be selected, by the message bus.

The message bus may be included in a communication system that allows an exchange of information to and from the at least one cluster instance in the set of high available cluster instances. The message bus may identify the at least one cluster instance by using (i) at least one IP address, (ii) at least one cluster instance identification, (iii) at least one media access control (MAC) address, (iv) at least one logical node identifier, (v) a service registry in which the at least one cluster instance has been registered, etc.

The leader cluster instance may select a topic that is related to the activity request. A topic may include (i) health monitoring of the at least one cluster instance, (ii) resource utilization of the at least one cluster instance, (iii) at least one security control event, (iv) at least one conflict resolution for data managed by the at least one cluster instance, etc. The topic that is selected by the leader cluster instance may be transmitted to a message bus and stored, for example, in a data management repository.

Therefore, when the activity request has been made by a client device, the message bug may receive the activity request. Using the activity request, the topic of the activity request may be determined by the message bus. The topic of the activity request made be determined by reading content and/or metadata of the activity request.

Once the topic of the activity request has be determined, a topic subscriber identification may be determined by the message bus. The topic subscriber identification may be determined by performing a search, for example, in the data management repository of the message bus, for the at least one cluster instance associated with the topic. The at least once cluster instance may include a leader cluster instance. The leader cluster instance may be identified using (i) the at least one IP address, (ii) the at least one cluster instance identification, (iii) the at least one media access control (MAC) address, (iv) the at least one logical node identifier, (v) the service registry, etc.

Once the leader cluster instance has been identified, the activity request may be distributed to the leader cluster instance. The activity request may be distributed using a data stream, a message queue, shared memory, etc. Once the leader cluster instance has received the activity request from the message bus, the leader cluster instance and/or the at least one cluster instance may perform the at least one command associated with the activity request.

To provide the above noted functionality, the system may include deployment 100, and client systems 104. Each of these components is discussed below.

Client systems 104 may include any number of at least one client device. The any number of at least one client device may include a smartphone, a laptop, a personal computer, etc. The any number of at least one client device may be used to initiate performance of at least one operation. The performance of the at least one operation may be initiated by generating an activity request by the at least one client device.

The activity request may include at least one command to perform, by deployment 100, to provide computer implemented services. The activity request may be received by deployment 100 by sending the activity request, by the at least one client device of client systems 104 through communication system 102 to deployment 100.

Deployment 100 may include any number of data processing system 100A-100N. The any number of data processing system 100A-100N may receive the activity request. The any number of data processing system 100A-100N may perform a service related to the activity request by distributing at least one command across at least one data processing system of the any number of data processing system 100A-100N. Distribution of the at least command may allow for execution of the at least one command.

With the distribution of the at least one command, the at least one command may be broken down into at least one smaller workload and performed simultaneously across the any number of data processing system 100A-100N. As a result of the performance of the at least one smaller workload across the any number of data processing system 100A-100N, high measure of throughout and/or a low measure of latency may be achieved in the performance of the activity.

Further, to facilitate distribution of the at least one command by communication system 102 to deployment 100, communication system 102 may include at least one data management repository. The at least one data management repository may store at least one topic with which an activity request is classified. Upon receiving the activity request, communication system 102, before distributing to the activity request to deployment 100, may read at least one portion of the activity request (e.g., content and/or metadata of the activity request, etc.).

Based on the at least one portion of the activity request, communication system 102 may perform a search within the at least one data management repository. The search may include a query for the any number of data processing system 100A-100N that is subscribed to the at least one topic of the activity request. Once at least one data processing system of the any number of data processing system 100A-100N that is subscribed to the topic is found, the activity request may be distributed to the at least one data processing system. The activity request may be distributed using a data stream, message queue, shared memory, etc.

Figure 1B:
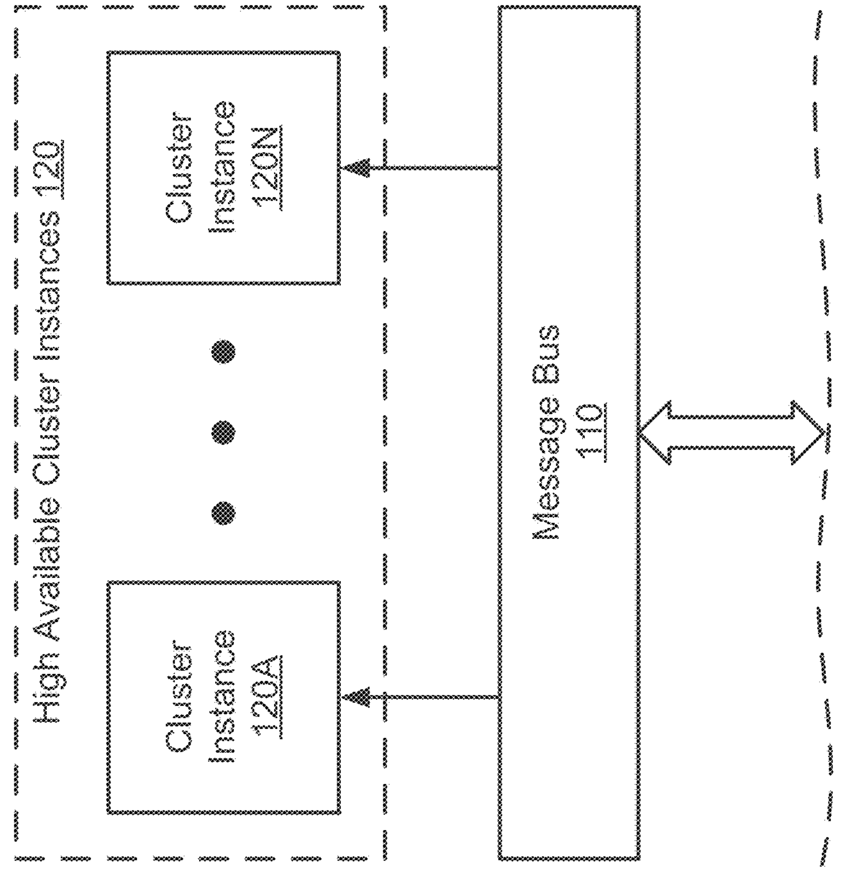
FIGS. 1B-1C show diagrams illustrating portions of a system in accordance with an embodiment.

Deployment 100 may include the any number of data processing system 100A-100N. The data processing systems may provide all, or a portion, of the computer implemented services provided by the system of FIG. 1A. To do so, each data processing system may include hardware components such as cluster instances, storage devices, etc. Refer to FIG. 1B for additional details regarding the hardware components of the data processing systems 100A-100N and communication system 102.

While providing their functionality, any of deployment 100 and client systems 104 may perform all, or a portion, of the flows and methods shown in FIGS. 2A-3D.

Any of (and/or components thereof) deployment 100 and client systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1A as including a limited number of specific components, a system in accordance with an embodiment may include fewer, additional, and/or different components than those components illustrated therein.

Turning to FIG. 1B, a portion of the system in accordance with an embodiment is shown. To provide the above noted functionality, the portion of the system may include any number of cluster instance 120A-120N of high available cluster instances 120 and message bus 110. Each of these components is discussed below.

The activity request, from the description of FIG. 1A, may be sent from a client device. The activity request may include at least one command to perform, by deployment 100, to provide computer implemented services. The activity request may be received by sending the activity request using an application programming interface (API) call that is provided by message bus 110. Message bus 110 may be included in communication system 102 from FIG. 1A.

The activity request may be received by message bus 110. To receive the activity request, the client device may need to be configured with message bus 110. To be configured, the client device may need to have stored at least one connection parameter. The at least one connection parameter may include (i) an IP address of message bus 110, (ii) a port of message bus 110, (iii) a network protocol used by message bus 110, (iv) at least one authentication credential to connect securely to message bus 110, (v) at least one topic, queue, and/or channel to which the activity request will be subscribed to, etc.

Using the description of FIG. 1A, message bus 110 of communication system 102 may (i) classify a topic of the activity request, (ii) find at least one data processing system which is subscribed to the topic, and (iii) distribute the activity request to the at least one data processing system.

The at least one data processing system of the any number of data processing system 100A-100N may include the any number of cluster instance 120A-120N. The any number of cluster instance 120A-120N may include at least one compute node in which performance of a service of the activity request and/or processing of data takes place. The any number of cluster instance 120A-120N may perform the service receiving the activity request from message bus 110 and performing at least command of the service.

To receive the activity request from message bus 110, a leader cluster instance may be elected, the leader cluster instance may subscribe to a leader topic, and then the subscription of the leader topic may be populated by message bus 110 in the data management repository. The leader cluster instance may be elected by casting at least one vote by the any number of cluster instance 120A-120N. A voting process for casting the at least one vote may be facilitated using, for example, a publish and/or subscribe method. The at least one vote may be received by message bus 110. After collecting, by message bus 110, a sufficient number votes from the any number of cluster instance 120A-120N, a majority vote may be determined by message bus 110 for a cluster instance. Whichever cluster instance of the any number of cluster instance 120A-120N receives the majority vote may be selected, by message bus 110, to be a leader cluster instance.

Once the leader cluster instance has been selected, the leader cluster instance may subscribe to the leader topic. The leader cluster instance may subscribe to the leader topic by notifying message bus 110 to distribute an activity request associated with the leader topic to the leader cluster instance. Finally, the subscription of the topic may be populated by message bus 110 by storing a record of the subscription of the leader topic in the data management repository.

Figure 1C:
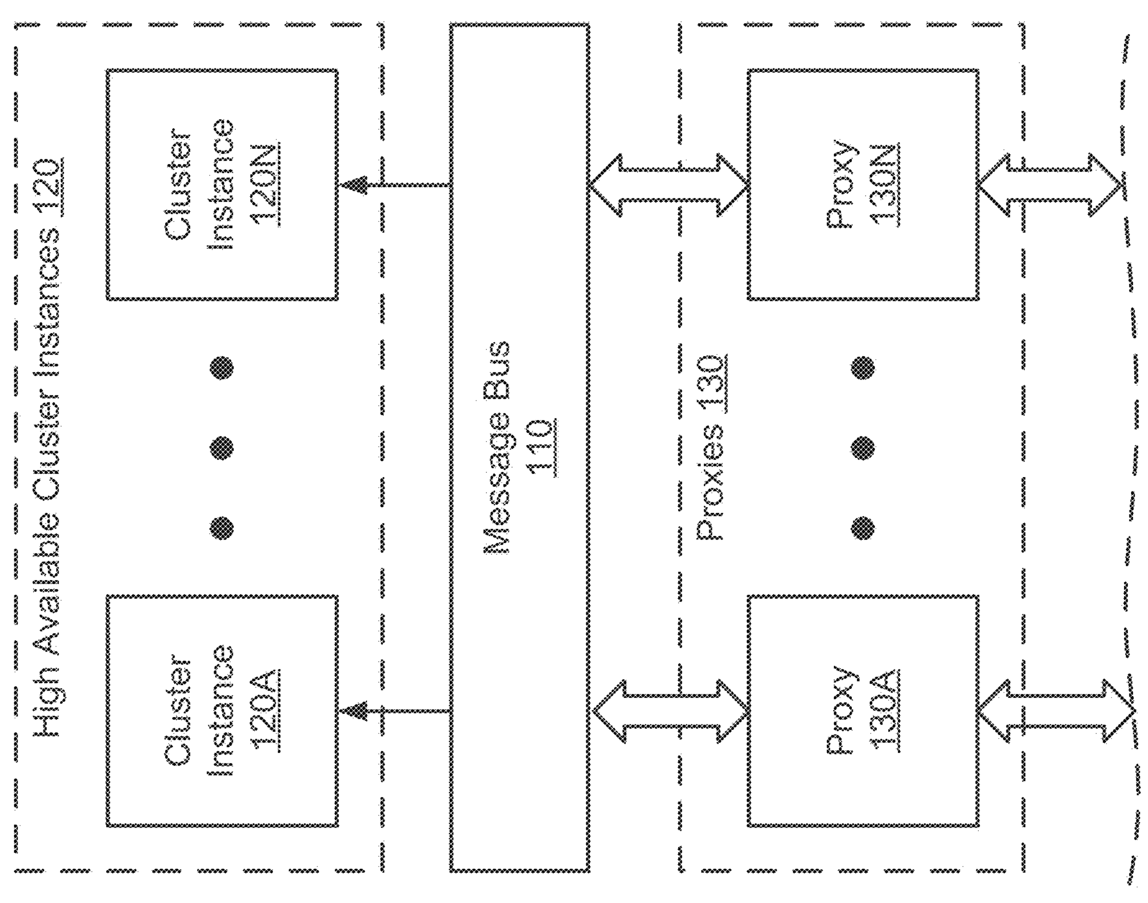
Figure 3A:
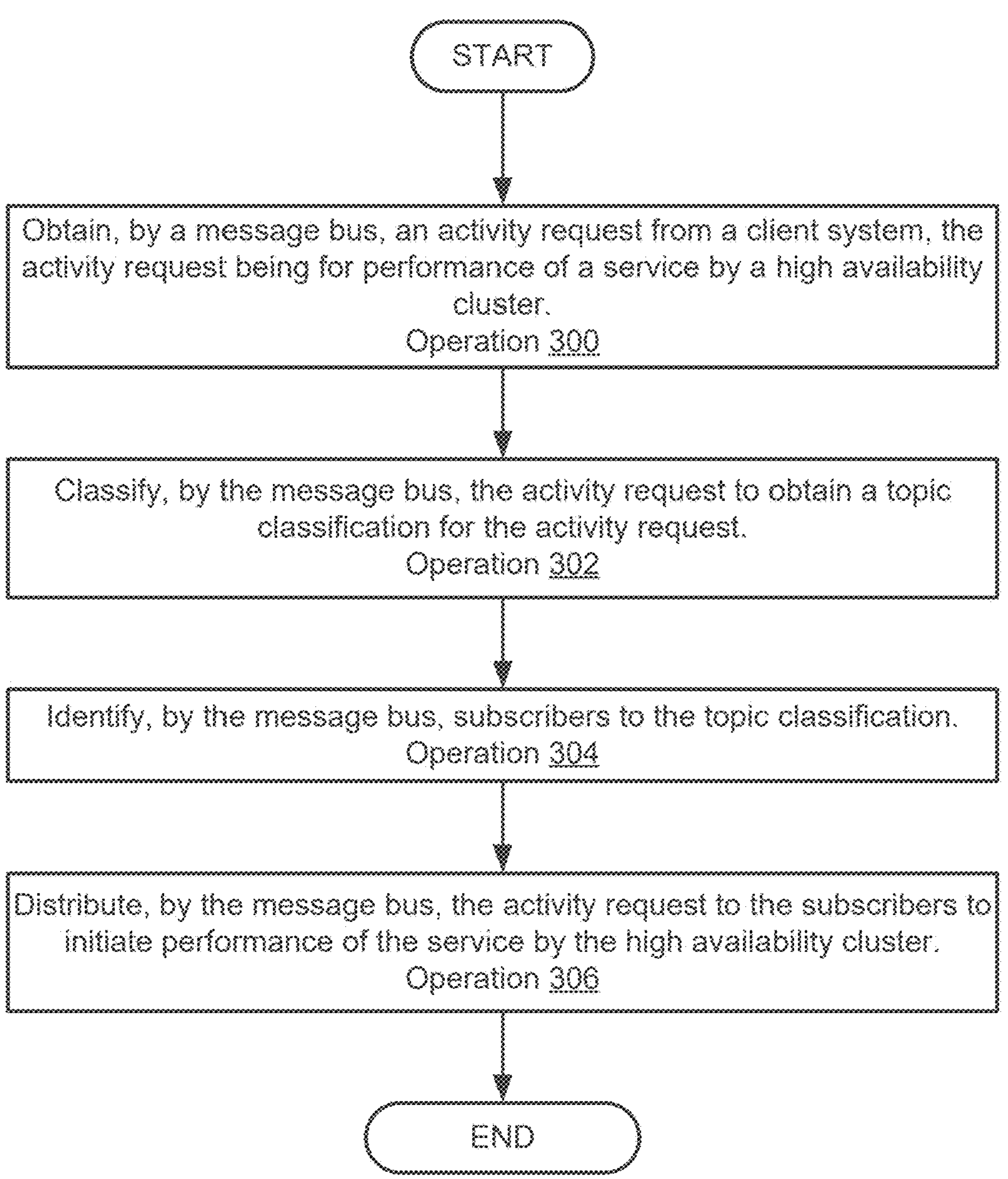
FIGS. 3A-3D show flow diagrams illustrating at least one method in accordance with an embodiment.
Figure 3B:
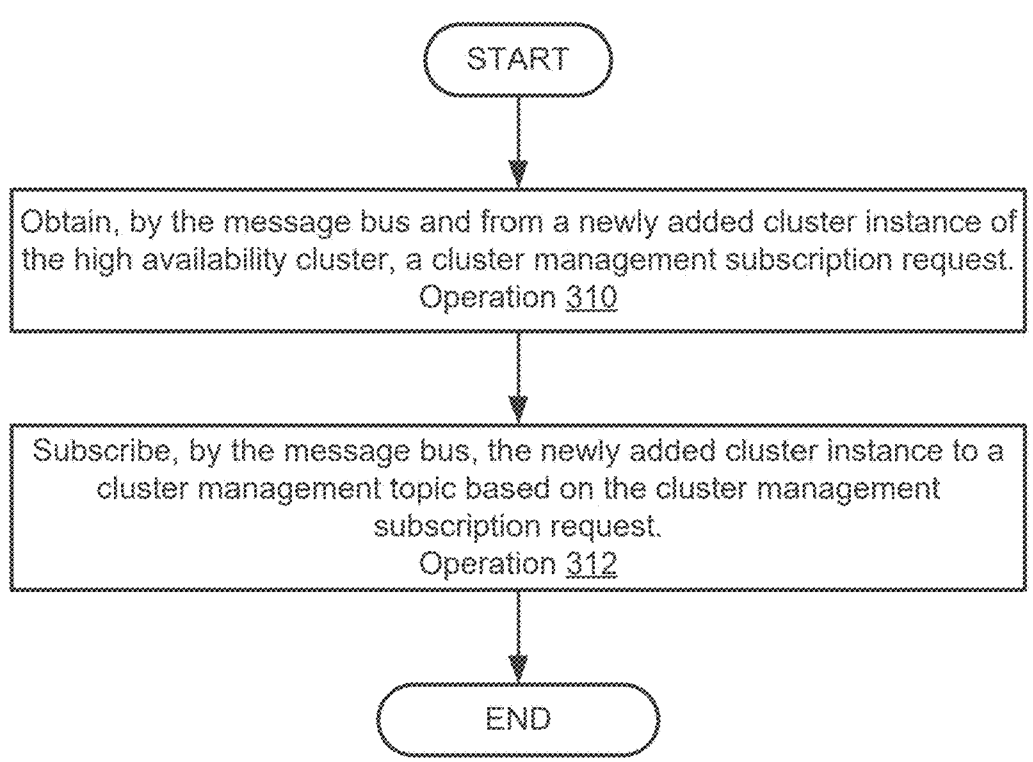
Figure 3C:
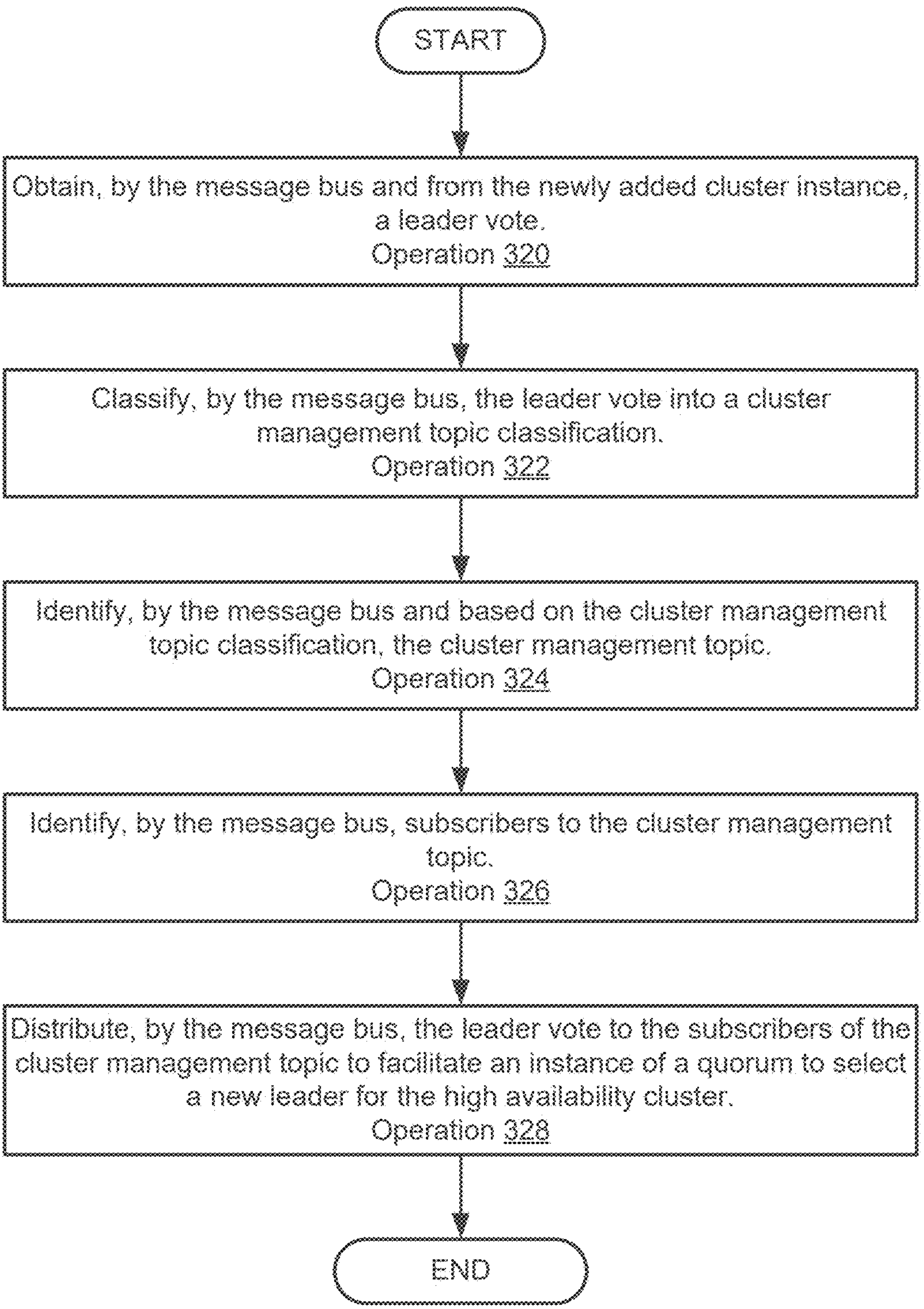

The system of FIG. 1B may also include proxies 130, as shown in FIG. 3C. Refer to FIG. 1C for additional details regarding the hardware components of proxies 130.

While illustrated in FIG. 1B as including a limited number of specific components, the system in accordance with an embodiment may include fewer, additional, and/or different components than those components illustrated therein.

Turning to FIG. 1C, a portion of system in accordance with an embodiment is shown. To provide the above noted functionality, the portion of the system may include any number of cluster instance 120A-120N of high available cluster instances 120, message bus 110, and proxy 130A-130N of proxies 130. Each of these components is discussed below.

The any number of cluster instance 120A-120N of high available cluster instances 120 in FIG. 1C may be similar to the any number of cluster instance 120A-120N of high available cluster instances 120 in FIG. 1B. Therefore, the description of the any number of cluster instance 120A-120N of high available cluster instances 120 in FIG. 1C may include the description of the any number of cluster instance 120A-120N of high available cluster instances 120 in FIG. 1C. As well, message bus 110 in FIG. 1C may be similar to FIG. 1B. Therefore, the description of message bus 110 in FIG. 1C may include the description of message bus 110 in FIG. 1C.

As mentioned in the description of FIG. 1B, an activity request may be received by message bus 110. To receive the activity request, the client device may need to be configured with message bus 110. To be configured, the client device may need to have stored at least one connection parameter. The at least one connection parameter may include (i) an IP address of message bus 110, (ii) a port of message bus 110, (iii) a network protocol used by message bus 110, (iv) at least one authentication credential to connect securely to message bus 110, (v) at least one topic, queue, and/or channel to which the activity request will be subscribed to, etc.

Between the client device and message bus 110, proxies 130 may be included. Proxies 130 may include any number of proxies 130A-130N. The any number of proxies 130A-130N may facilitate transmission of the activity request from the client device to message bus 110. The any number of proxies 130A-130N may facilitate the transmission by (i) reducing a requirement of the at least one connection parameter, (ii) managing traffic associated with at least one activity request sent by the client device, (iii) enforcing at least one security protocol during the transmission, (iv) converting, if necessary, between at least one network protocol, (v) using retry logic and/or at least one queued message if message bus 110 is unavailable, etc.

The requirement of the at least one connection parameter may be reduced by the any number of proxies 130A-130N because the any number of proxies 130A-130N may use an application programming interface (API) call to interact with message bus 110. The client device may use an endpoint of the any number of proxies 130A-130N, which is used to forward the activity request to message bus 110. After forwarding the activity request from the client device to message bus 110, the any number of proxies 130A-130N may monitor message bus 110 for a response from message bus 110. If message bus 110 generated the response (e.g., message received, error, etc.), the any number of proxies 130A-130N may forward the response to the client device, resend the activity request, etc.

While illustrated in FIG. 1C as including a limited number of specific components, the system in accordance with an embodiment may include fewer, additional, and/or different components than those components illustrated therein.

Figure 2A:
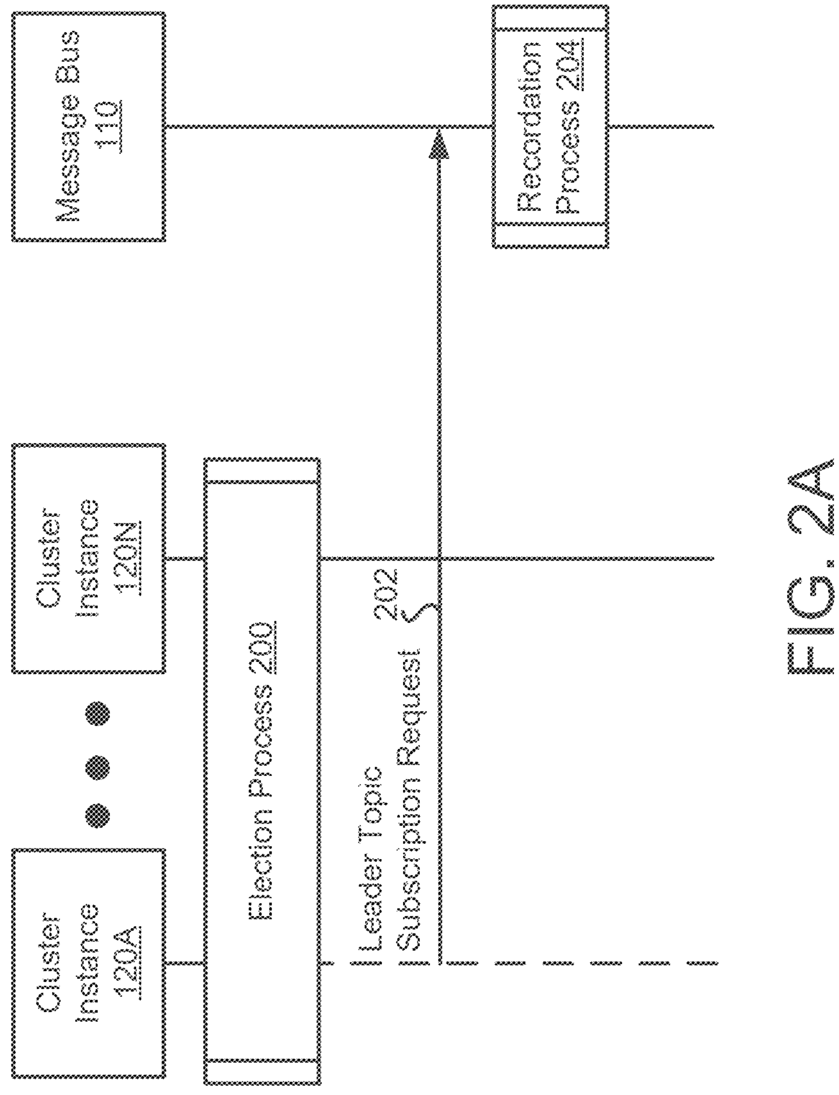
FIGS. 2A-2C show interaction diagrams illustrating operation of a system in accordance with an embodiment.
Figure 2B:
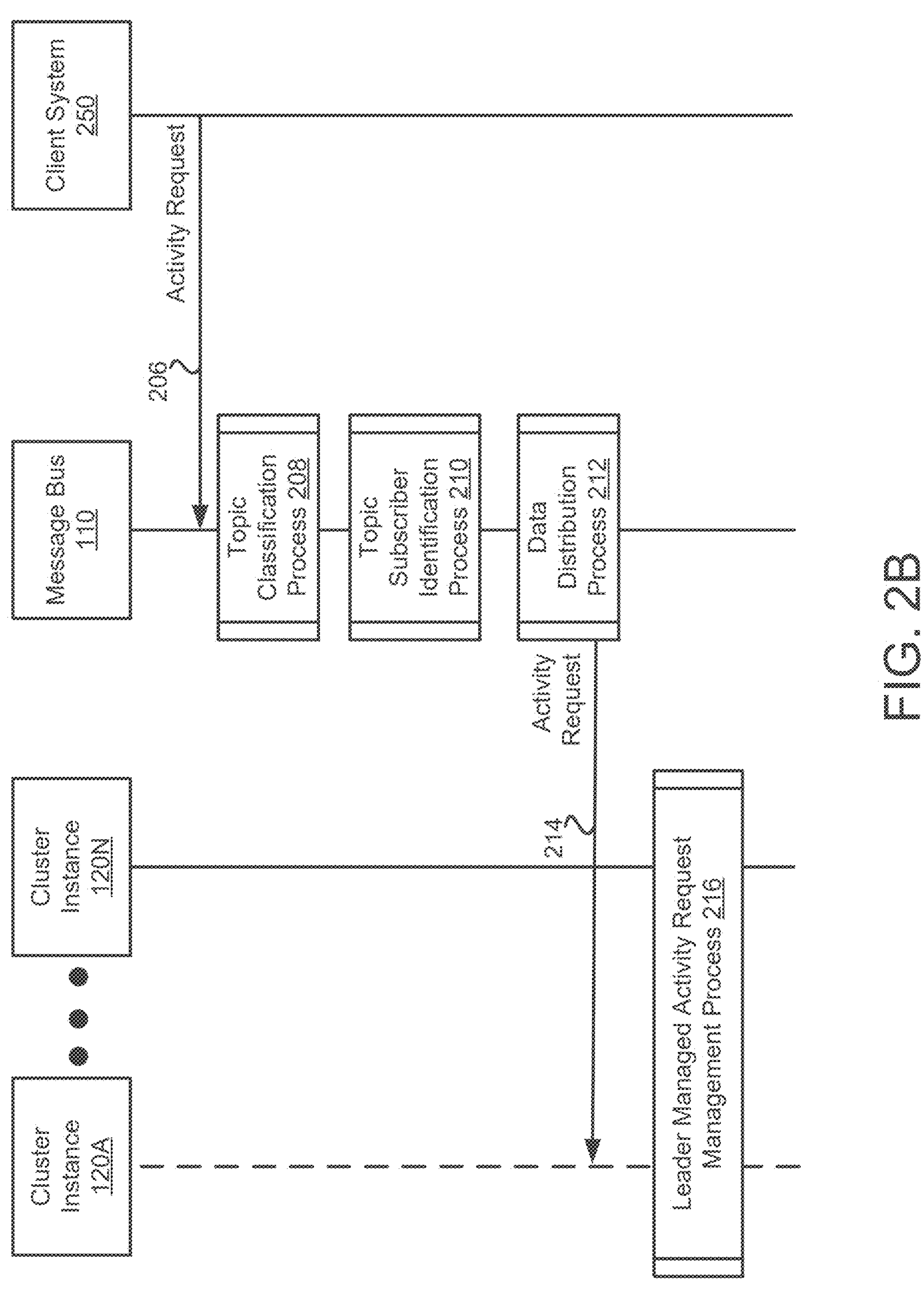
Figure 2C:
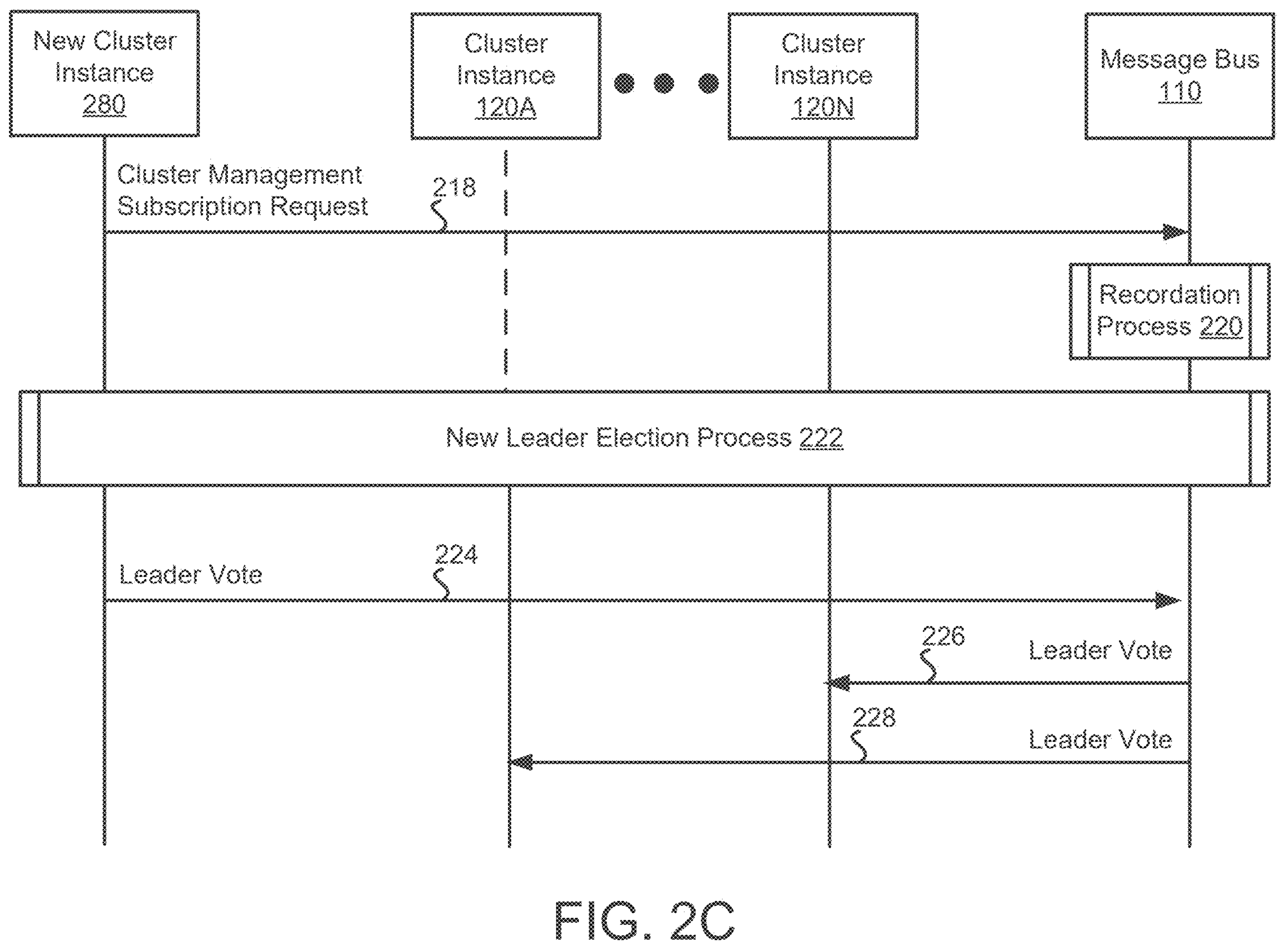

To further clarify embodiments disclosed herein, interactions diagrams in accordance with an embodiment are shown in FIGS. 2A-2C. These interactions diagrams may illustrate how data may be obtained and used within the system of FIG. 2A-2C.

In the interaction diagrams, processes performed by and interactions between components of a system in accordance with an embodiment are shown. In the diagrams, components of the system are illustrated using a first set of shapes (e.g., 120A, 110, etc.), located towards the top of each figure. Lines descend from these shapes. Processes performed by the components of the system are illustrated using a second set of shapes (e.g., 200, 204, etc.) superimposed over these lines. Interactions (e.g., communication, data transmissions, etc.) between the components of the system are illustrated using a third set of shapes (e.g., 202, 206, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 206 may occur prior to the interaction labeled as 214. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate data used in and data processing performed in recording a leader topic of a subscription request.

To record the leader topic of the subscription request, election process 200 may be performed. During election process 200, at least one cluster instance of any number of cluster instances (e.g., 120A-120N) may detect that a leader cluster instance is not present. The at least one cluster instance of the any number of the cluster instances (e.g., 120A-120N) may detect that the leader cluster instance is not present because (i) a previous leader cluster instance fails to send at least one signal to the at least one cluster instance of the any number of the cluster instances (e.g., 120A-120N), (ii) at least one cluster instance of the any number of the cluster instances (e.g., 120A-120N) boots to startup and the leader cluster had not yet been selected, (iii) the previous leader cluster may have voluntarily resigned due to, for example, a load balancing issue, a maintenance issue, etc.

Because the leader cluster instance has not been detected, a leader cluster instance election may be performed. The leader cluster instance election may be performed by collecting, by the message bus (e.g., 110) a majority of votes in favor of selection of the leader cluster instance. The majority of the votes may be collected by (i) sending, by the at least one cluster instance, a vote in favor of a cluster instance of the any number of the cluster instances (e.g., 120A-120N) to the message bus (e.g., 110), (ii) receiving, by the message bus (e.g., 110), the vote, and (iii) determining a majority vote based on a collection of votes from the any number of the cluster instances (e.g., 120A-120N). The cluster instance that receives the majority vote may be selected as the leader cluster instance.

Once the leader cluster instance (e.g., 120A) has been selected, a leader topic subscription request may be performed. The leader topic subscription request may be performed by selecting, by the leader cluster instance (e.g., 120A), a leader topic associated with an activity that can be performed by the at least one cluster instance. The leader topic may include (i) health monitoring of the at least one cluster instance, (ii) resource utilization of the at least one cluster instance, (iii) security control events, (iv) conflict resolution in data managed by the at least one cluster instance, etc.

Once the leader topic has been selected, the leader cluster instance (e.g., 120A) may subscribe to the topic (e.g., 202). The leader cluster instance (e.g., 120A) may subscribe to the topic by notifying a message bus (e.g., 110) to route at least one activity request to the leader cluster instance (e.g., 120A) that is relevant to the leader topic. The message bus may be notified using a data stream, message queue, shared memory, etc.

Once the message bus (e.g., 110) has been notified of the subscription, by the leader cluster instance (e.g., 120A), to the leader topic, recordation process 204 may begin. During recordation process 204, the leader topic may be associated with the leader cluster instance (e.g., 120A) in a data structure such as a hash map, dictionary, etc. The leader topic and/or the leader cluster instance (e.g., 120A) may be, for example, recorded as a key and/or value pair in the hash map, the dictionary, etc. The hash map, the dictionary, etc. may include at least one pair of the leader topic and/or the leader cluster instance (e.g., 120A). The hash map, the dictionary, etc. may be stored in a data management repository of the message bus (e.g., 110).

Thus, via the interaction illustrated in FIG. 2A, a system in accordance with an embodiment may record the leader topic of the subscription request. Consequently, a deployment (e.g., 100) may be more likely to be able to provide desired computer implemented services by authorizing the message bus (e.g., 110), using a subscription of the subscription request, to distribute an activity request that includes the leader topic to the leader cluster instance (e.g., 120A).

Turning to FIG. 2B, a second interaction diagram in accordance with an embodiment is shown. The second interaction diagram may illustrate data used in and data processing performed in completing an activity request.

To complete an activity request, the activity request may be transmitted from a client device of the client system (e.g., 250) to a message bus (e.g., 110). The activity request may be transmitted using a data stream, message queue, shared memory, etc.

Once the message bus (e.g., 110) receives the activity request, topic classification process 208 may begin. During topic classification process 208, the message bus (e.g., 110) may classify the activity request with at least one leader topic. The message bus may classify the activity request by reading content and/or metadata of the activity request. The message bus (e.g., 110) may derive the at least one leader topic of the activity request from the content, metadata, etc. of the activity request. To derive the at least one leader topic, the message bus (e.g., 110) may use, for example, at least one message broker, at least one message-oriented middleware, etc. to read a header, metadata, etc. of the activity request.

Once the at least one leader topic has been classified, topic subscriber identification process 210 may be performed. During topic subscriber identification process 210, the at least one leader topic may be compared to at least one pair of a leader topic and/or a leader cluster instance. The at least one pair of the leader topic and/or the leader cluster instance may be recorded as a key and/or value pair in a hash map, a dictionary, etc. The hash map, the dictionary, etc. may be stored in a data management repository in the message bus (e.g., 110).

The at least one message broker, the at least one message-oriented middleware, etc. may retrieve the hash map, the dictionary, etc. from the data management repository. The at least one message broker, the at least one message-oriented middleware, etc. may then perform a search in the hash map, the dictionary, etc. for the at least one leader topic. The at least one pair of the leader topic and/or the leader cluster instance. An identification of the leader cluster instance (e.g., 120A) may be extracted from the at least one pair of the topic and/or the leader cluster instance. The identification of the leader cluster instance (e.g., 120A) may include (i) at least one IP address, (ii) at least one cluster instance identification, (iii) at least one media access control (MAC) address, (iv) at least one logical node identifier, etc.

Using the identification of the leader cluster instance (e.g., 120A), data distribution process 212 may be performed. During data distribution process 212, the activity request may be validated. The activity request may be validated by, for example, ensuring by the message bus (e.g., 110) that at least one required input of the activity request includes information and a field of the input is not empty. For example, the message bus (e.g., 110) may check that at least one field, such as a user identification, an action, a timestamp, etc. includes, respectively, an identification for a user of a client device that sent the activity request, at least one method to be performed, and a date and/or time of the activity request.

During data distribution process 212, if the leader cluster instance (e.g., 120A) is not immediately available to receive the activity request, the activity request may be queued by the message bus (e.g., 110) for a later delivery to the leader cluster instance (e.g., 120A).

Once the leader cluster instance (e.g., 120A) is available to receive the activity request, activity request may be transmitted (e.g., 214) to the leader cluster instance (e.g., 120A). The activity request may be transmitted using the data stream, the message queue, the shared memory, etc.

Once the activity request has been received, leader management activity request management process 216 may be performed. During leader management activity request management process 216, the leader cluster instance (e.g., 120A) may perform at least one command based on the activity request. The at least one command may include data processing (e.g., processing a data set using a machine learning model), database query (e.g., fetch and/or update information in a database), service orchestration (e.g., coordinate at least one microservice to complete a multi-step request), etc. The at least one command may be passed to a second at least one cluster instance (e.g., 120B, etc.) to perform the at least one command.

Thus, via the interaction illustrated in FIG. 2B, a system in accordance with an embodiment may complete the activity request. Consequently, a deployment (e.g., 100) may be more likely to be able to provide desired computer implemented services by transmitting the activity request from the client device, though the message bus (e.g., 110), to the leader cluster instance (e.g., 120A) for performance of a service of the activity request by the at least one cluster instance (e.g., 120A, 120B, etc.).

Turning to FIG. 2C, a third interaction diagram in accordance with an embodiment is shown. The third interaction diagram may illustrate data used in and data processing performed in including a new cluster instance (e.g., 280) in the high availability cluster.

To include the new cluster instance (e.g., 280) in the high availability cluster, cluster management subscription request 218 may be performed. During cluster management subscription request 218, the new cluster instance (e.g., 280) may request to be subscribed to a cluster management topic. The cluster management topic may include (i) cluster instance registration, (ii) cluster instance health monitoring, etc. The cluster management topic may be associated with the at least one cluster instance (e.g., 120A-120N) in at least one pair of the cluster management topic and/or the at least one cluster instance (e.g., 120A-120N). The at least one pair may be recorded as a key and/or value pair in a hash map, a dictionary, etc. The hash map, the dictionary, etc. may be stored in a data management repository in the message bus (e.g., 110).

To request to be subscribed to the cluster management topic, the new cluster instance (e.g., 280) may transmit a notification to the message bus (e.g., 110). The notification may include an identification of the new cluster instance (e.g., 280) (for example, (i) at least one IP address, (ii) at least one cluster instance identification, (iii) at least one media access control (MAC) address, (iv) at least one logical node identifier, etc.) and the topic. The notification may be transmitted using a data stream, a message queue, a shared memory, etc.

Once the notification may be received, recordation process 220 may be performed. During recordation process 220, the cluster management topic and the new cluster instance may be associated in the at least one pair of the key and/or the value pair. The cluster management topic may be included as the key and/or the new cluster instance included with the value, the value including the at least one cluster instance (e.g., 120A-120N).

As a result of subscribing the new cluster instance (e.g., 280) to the topic, new leader election process 222 may be performed. During new leader election process 222, a new leader cluster instance may be selected to replace the leader cluster instance (e.g., 120A). The new leader cluster instance may be selected by performing a new leader cluster instance election. The new leader cluster instance election may be performed by performing, by at least one cluster instance, a voting process.

To perform the voting process, a publish and/or subscribe method may be used by the message bus (e.g., 110). During the voting process, at least one vote may be received by the message bus (e.g., 110). After receiving, by message bus 110, a sufficient number votes from the at least one cluster instance (e.g., 120A-120N), a majority vote may be determined by the message bus (e.g., 110) for a cluster instance. Whichever cluster instance of the at least one cluster instance (e.g., 120A-120N) receives the majority vote may be selected, by the message bus (e.g. 110), to be a new leader cluster instance.

For example, the new cluster instance (e.g., 280) may submit the vote in favor of a second cluster instance (e.g., 120F) to act as the new cluster leader instance. The vote may be submitted (e.g., 224) to the message bus (e.g., 110). The message bus (e.g., 110) may receive the vote and notify (e.g., 226, 228) the second the at least one cluster instance of the vote. In the example, the second the at least one cluster instance may include a remaining portion of the cluster instances (e.g., 120A-120N, not including 120F). The message bus (e.g., 110) may select the new leader cluster instance based on the at least one cluster instance that received a majority of votes.

Thus, via the interaction illustrated in FIG. 2C, a system in accordance with an embodiment may include the new cluster instance (e.g., 280) in the high availability cluster. Consequently, a deployment (e.g., 100) may be more likely to be able to provide desired computer implemented services by performing an election of the new cluster leader instance after a subscription request has been made by a new cluster instance.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1C may perform various methods to manage operation of a deployment of data processing systems. FIG. 3A illustrates a method that may be performed by the components of the system of FIGS. 1A-1C. In the diagram discussed below and shown in FIG. 3A, any of the operations may be repeated, performed in different orders, and/or performed in parallel with or in a partially overlapping in time manner with other operations.

Turning to FIG. 3A, a flow diagram illustrating a method of managing operation of a deployment of data processing systems in accordance with an embodiment is shown. The method may be performed, for example, by any of the components of the system of FIGS. 1A-1C, and/or other components not shown therein.

At operation 300, an activity request may be obtained, by a message bus and from a client system, the activity request being for performance of a service by a high availability cluster. The activity request may be obtained by receiving the activity request from a client device of the client system.

At operation 302, the activity request may be classified, by the message bus, to obtain a topic classification for the activity request. The activity request may be classified by (i) reading content, metadata, etc. of the activity request, and (ii) deriving a topic classification based on the content, the metadata, etc.

At operation 304, subscribers to the topic classification may be identified by the message bus. The subscribers may be identified by extracting the subscribers from a data management repository. The data management repository may be stored at least one hash map, at least one dictionary, etc. In the at least one hash map, the at least one dictionary, etc., at least one pair may be stored. The at least one pair may include the topic classification as a key and at least one subscriber of the subscribers as a value.

At operation 306, the activity request may be distributed by the message bus to the subscribers to initiate performance of the service by the high availability cluster. The activity request may be distributed by transmitting the activity request to the subscribers using, for example, a data stream, a message queue, shared memory, etc.

The method may end following operation 306.

Thus, via the method shown in FIG. 3A, embodiments herein may likely improve a likelihood of managing operation of a deployment of data processing systems. By improving the likelihood of managing operation of a deployment of data processing systems, the data processing systems may be more likely to provide desirable computer implemented services by, for example, facilitating transmission of the activity request using the message bus, storing, by the message bus, the topic classification of the subscriber of the subscribers, etc.

As discussed above, the components of FIGS. 1A-1C may perform various methods to manage operation of a deployment of data processing systems. FIG. 3B illustrates a method that may be performed by the components of the system of FIGS. 1A-1C. In the diagram discussed below and shown in FIG. 3B, any of the operations may be repeated, performed in different orders, and/or performed in parallel with or in a partially overlapping in time manner with other operations.

Turning to FIG. 3B, a flow diagram illustrating a method of managing operation of a deployment of data processing systems in accordance with an embodiment is shown. The method may be performed, for example, by any of the components of the system of FIGS. 1A-1C, and/or other components not shown therein.

At operation 310, a cluster management subscription request may be obtained and from a newly added cluster instance of the high availability cluster. The cluster management subscription request may be obtained by receiving the cluster management subscription request from the newly added cluster instance.

At operation 312, the newly added cluster instance may be subscribed, by the message bus, to a cluster management topic based on the cluster management subscription request. The newly added cluster instance may be subscribed by storing the cluster management topic with an identification of the newly added cluster instance. The identification may include (i) at least one IP address, (ii) at least one cluster instance identification, (iii) at least one media access control (MAC) address, (iv) at least one logical node identifier, etc. The cluster management topic and the identification may be stored in a pair with the cluster management topic as a key and the identification as the value. The pair may be stored in a hash map, dictionary, etc. The hasp map, the dictionary, etc. may be stored in a data management repository of the message bus.

The method may end following operation 312.

Thus, via the method shown in FIG. 3B, embodiments herein may likely improve a likelihood of managing operation of a deployment of data processing systems. By improving the likelihood of managing operation of a deployment of data processing systems, the data processing systems may be more likely to provide desirable computer implemented services by, for example, receiving a subscription request from the newly added cluster instance, storing, by the message bus, a subscription of the subscription request of the newly added cluster instance.

As discussed above, the components of FIGS. 1A-1C may perform various methods to manage operation of a deployment of data processing systems. FIG. 3C illustrates a method that may be performed by the components of the system of FIGS. 1A-1C. In the diagram discussed below and shown in FIG. 3C, any of the operations may be repeated, performed in different orders, and/or performed in parallel with or in a partially overlapping in time manner with other operations.

Turning to FIG. 3C, a flow diagram illustrating a method of managing operation of a deployment of data processing systems in accordance with an embodiment is shown. The method may be performed, for example, by any of the components of the system of FIGS. 1A-1C, and/or other components not shown therein.

At operation 320, a leader vote may be obtained by a message bus and from the newly added cluster instance. The leader vote may be obtained by receiving the leader vote from the newly added cluster instance.

At operation 322, the leader vote may be classified, by the message bus, into a cluster management topic. The leader vote may be classified into a cluster management topic by reading content of the leader vote. The content may include data such as a string identifier, a serial number, etc. Using the data, a search may be performed by the message bus in a data management repository for the data. The search may be performed in a dictionary, hash map, etc. of a data management repository. At least one pair may be found in the dictionary, the hash map, etc. The at least one pair may include a key and a value. The key may include the data (the string identifier, the serial number, etc.). The value of the key may include the cluster management topic classification. With the cluster management topic classification, the newly added cluster instance may be classified.

At operation 324, the cluster management topic may be identified, by the message bus and based on the cluster management topic classification. The cluster management topic may be identified by performing a second search, by the message bus, in a second dictionary, a second hash map, etc. of the data management repository. A second at least one pair may be found in the second dictionary, the second hash map, etc. The second at least one pair may include a second key and a second value. The second key may include the cluster management topic classification. The second value of the second key may include the cluster management topic. Thus, with the cluster management topic classification, the cluster management topic may be identified.

At operation 326, subscribers may be identified, by the message bus, to the cluster management topic. The subscribers may be identified by performing a third search in the data management repository. A third at least one pair may be found in the third dictionary, the third hash map, etc. The third at least one pair may include a third key and a third value. The third key may include the cluster management topic. The third value of the third key may include the subscribers. Thus, using the cluster management topic, the subscribers may be identified.

At operation 328, the leader vote may be distributed, by the message bus, to the subscribers of the cluster management topic to facilitate an instance of a quorum to select a new leader for the high availability cluster. The leader vote may be distributed by transmitting the leader vote to the subscribers. The leader vote may be transmitted using a data stream, a message queue, shared memory, etc.

The method may end following operation 328.

Thus, via the method shown in FIG. 3C, embodiments herein may likely improve a likelihood of managing operation of a deployment of data processing systems. By improving the likelihood of managing operation of a deployment of data processing systems, the data processing systems may be more likely to provide desirable computer implemented services by, for example, managing, by the message bus, a high availability cluster, facilitating, by the message bus, distribution of the leader vote from the newly added cluster instance to the subscribers, etc.

Figure 3D:
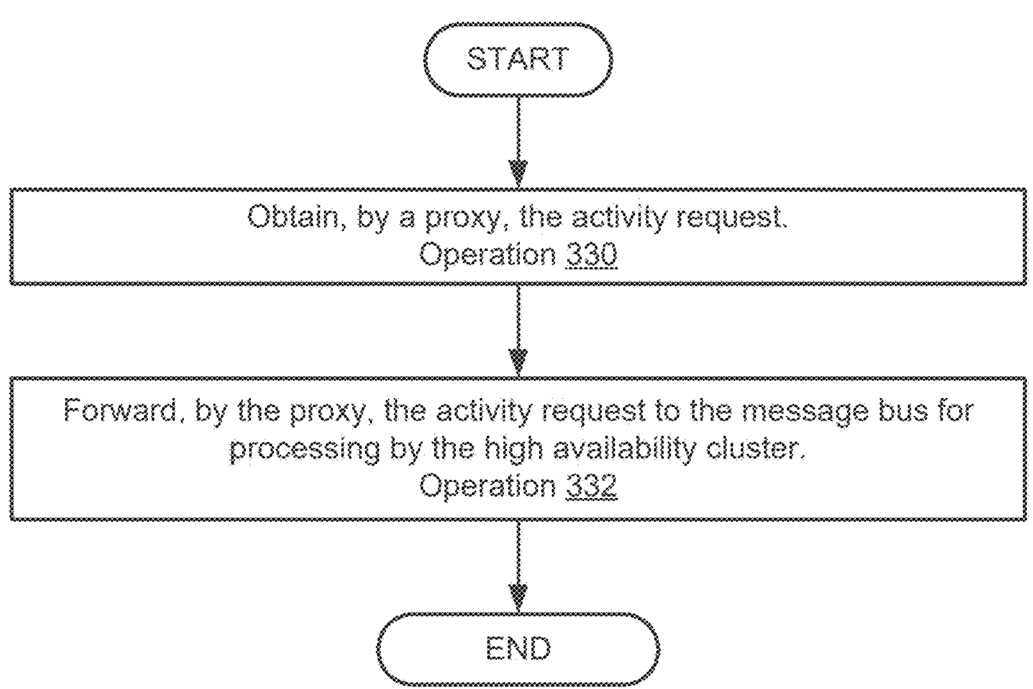

As discussed above, the components of FIGS. 1A-1C may perform various methods to manage operation of a deployment of data processing systems. FIG. 3D illustrates a method that may be performed by the components of the system of FIGS. 1A-1C. In the diagram discussed below and shown in FIG. 3D, any of the operations may be repeated, performed in different orders, and/or performed in parallel with or in a partially overlapping in time manner with other operations.

Turning to FIG. 3D, a flow diagram illustrating a method of managing operation of a deployment of data processing systems in accordance with an embodiment is shown. The method may be performed, for example, by any of the components of the system of FIGS. 1A-1C, and/or other components not shown therein.

At operation 330, the activity request may be obtained by a proxy. The activity request may be obtained by receiving, from a client device, the activity request.

At operation 332, the activity request may be forwarded, by the proxy, to the message bus, for processing by the high availability cluster. The activity request may be forwarded by transmitting the activity request from the client device, through the proxy, to the message bus. The activity request may be transmitted using a data stream, a message queue, shared memory, etc. The proxy may facilitate transmission of the activity request by (i) reducing a requirement of at least one connection parameter of the message bus, (ii) managing traffic associated with the activity request sent by the client device, (iii) enforcing at least one security protocol during the transmission, (iv) converting, if necessary, between at least one network protocol, (v) using retry logic and/or at least one queued message if the message bus is unavailable, etc.

The method may end following operation 332.

Thus, via the method shown in FIG. 3D, embodiments herein may likely improve a likelihood of managing operation of a deployment of data processing systems. By improving the likelihood of managing operation of a deployment of data processing systems, the data processing systems may be more likely to provide desirable computer implemented services by, for example, managing, by the proxy, transmission of the activity request from the client device to the message bus, etc.

Figure 4:
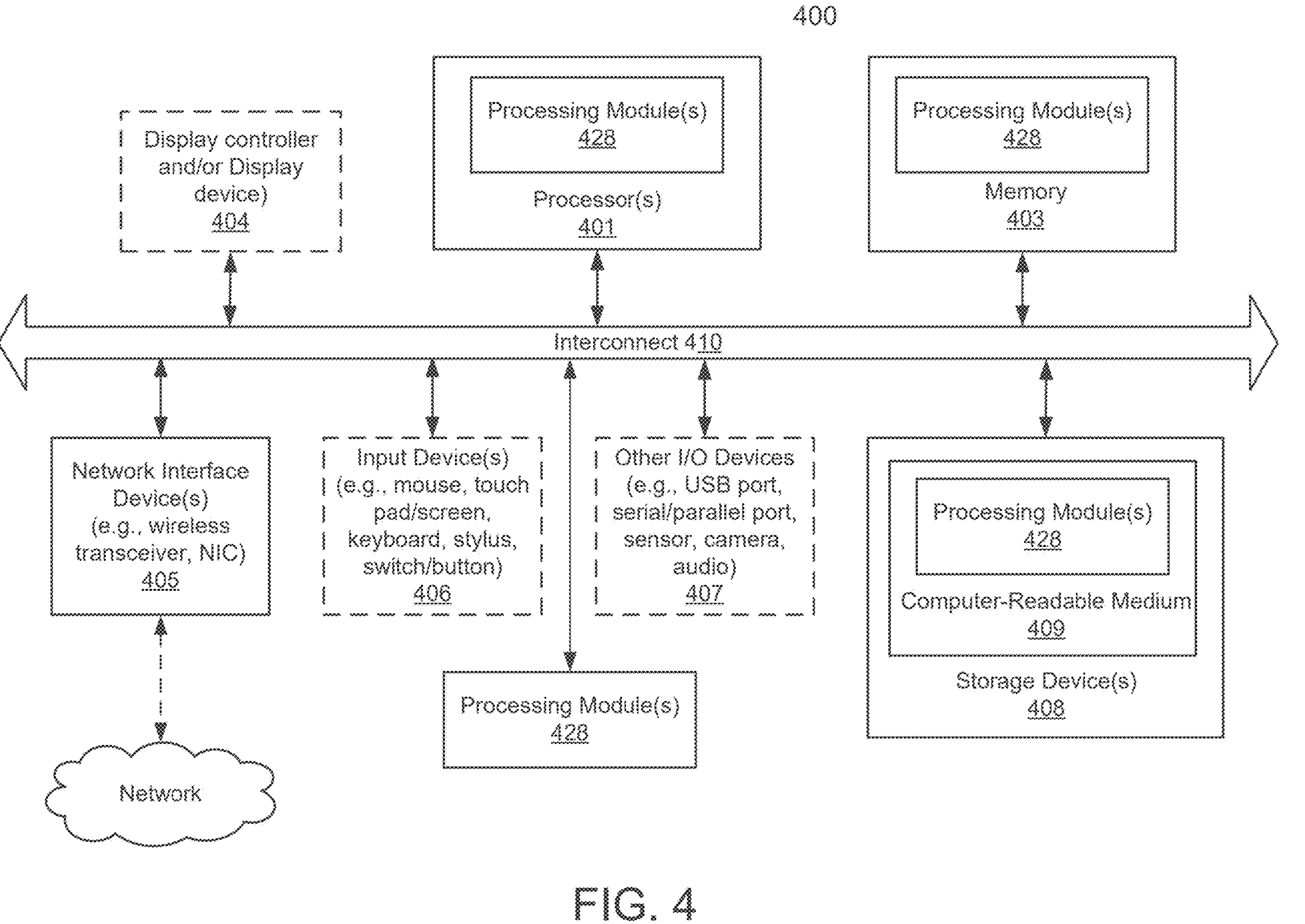
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment of data processing systems, the method comprising:

obtaining, by a message bus, an activity request from a client system, the activity request being for performance of a service by a high availability cluster;

classifying, by the message bus, the activity request to obtain a topic classification for the activity request;

identifying, by the message bus, subscribers to the topic classification;

distributing, by the message bus, the activity request to the subscribers to initiate the performance of the service by the high availability cluster;

obtaining, by the message bus and from a newly added cluster instance of the high availability cluster, a cluster management subscription request;

subscribing, by the message bus, the newly added cluster instance to a cluster management topic based on the cluster management subscription request;

obtaining, by the message bus and from the newly added cluster instance, a leader vote;

classifying, by the message bus, the leader vote into a cluster management topic classification;

identifying, by the message bus and based on the cluster management topic classification, the cluster management topic;

identifying, by the message bus, the subscribers to the cluster management topic; and distributing, by the message bus, the leader vote to the subscribers of the cluster management topic to facilitate an instance of a quorum to select a new leader for the high availability cluster.

2. The method of claim 1, wherein the topic classification is a leader topic, and a cluster instance of the high availability cluster is subscribed to the leader topic.

3. The method of claim 2, wherein each of the cluster instance of the high availability cluster is adapted to only subscribe to the leader topic while the respective cluster instance of cluster instances elected as a leader of the high availability cluster.

4. The method of claim 2, wherein the cluster instance is an elected leader for the high availability cluster.

5. The method of claim 4, wherein the high availability cluster is adapted to perform a quorum to select leaders for the high availability cluster, and the high availability cluster is adapted to have a single leader at any point in time.

6. The method of claim 1, further comprising:

obtaining, by a proxy, the activity request; and forwarding, by the proxy, the activity request to the message bus for processing by the high availability cluster.

7. The method of claim 6, wherein the subscribers comprise a first portion on a first sub-net and a second portion on a second sub-net, the first sub-net and the second sub-net being discontinuous.

8. A non-transitory machine-readable medium having instructions stored therein, which when executed by a processor, cause the processor to perform operations for managing operation of a deployment of data processing systems, the operations comprising:

obtaining, by a message bus, an activity request from a client system, the activity request being for performance of a service by a high availability cluster;

classifying, by the message bus, the activity request to obtain a topic classification for the activity request;

identifying, by the message bus, subscribers to the topic classification; and distributing, by the message bus, the activity request to the subscribers to initiate the performance of the service by the high availability cluster;

obtaining, by the message bus and from a newly added cluster instance of the high availability cluster, a cluster management subscription request;

subscribing, by the message bus, the newly added cluster instance to a cluster management topic based on the cluster management subscription request;

obtaining, by the message bus and from the newly added cluster instance, a leader vote;

classifying, by the message bus, the leader vote into a cluster management topic classification;

identifying, by the message bus and based on the cluster management topic classification, the cluster management topic;

identifying, by the message bus, the subscribers to the cluster management topic; and distributing, by the message bus, the leader vote to the subscribers of the cluster management topic to facilitate an instance of a quorum to select a new leader for the high availability cluster.

9. The non-transitory machine-readable medium of claim 8, wherein the topic classification is a leader topic, and a cluster instance of the high availability cluster is subscribed to the leader topic.

10. The non-transitory machine-readable medium of claim 9, wherein each cluster instance of the high availability cluster is adapted to only subscribe to the leader topic while the respective cluster instance of cluster instances elected as a leader of the high availability cluster.

11. The non-transitory machine-readable medium of claim 9, wherein the cluster instance is an elected leader for the high availability cluster.

12. The non-transitory machine-readable medium of claim 11, wherein the high availability cluster is adapted to perform a quorum to select leaders for the high availability cluster, and the high availability cluster is adapted to have a single leader at any point in time.

13. The non-transitory machine-readable medium of claim 8, further comprising:

obtaining, by a proxy, the activity request; and forwarding, by the proxy, the activity request to the message bus for processing by the high availability cluster.

14. The non-transitory machine-readable medium of claim 13, wherein the subscribers comprise a first portion on a first sub-net and a second portion on a second sub-net, the first sub-net and the second sub-net being discontinuous.

15. A data processing system, comprising:

a processor; and a memory coupled to the processor to store instructions, which when executed by the processor, cause the processor to perform operations managing operation of a deployment of data processing systems, the operations comprising:

obtaining, by a message bus, an activity request from a client system, the activity request being for performance of a service by a high availability cluster;

classifying, by the message bus, the activity request to obtain a topic classification for the activity request;

identifying, by the message bus, subscribers to the topic classification;

distributing, by the message bus, the activity request to the subscribers to initiate the performance of the service by the high availability cluster;

obtaining, by the message bus and from a newly added cluster instance of the high availability cluster, a cluster management subscription request;

subscribing, by the message bus, the newly added cluster instance to a cluster management topic based on the cluster management subscription request;

obtaining, by the message bus and from the newly added cluster instance, a leader vote;

classifying, by the message bus, the leader vote into a cluster management topic classification;

identifying, by the message bus and based on the cluster management topic classification, the cluster management topic;

identifying, by the message bus, the subscribers to the cluster management topic; and distributing, by the message bus, the leader vote to the subscribers of the cluster management topic to facilitate an instance of a quorum to select a new leader for the high availability cluster.

16. The data processing system of claim 15, wherein the topic classification is a leader topic, and a cluster instance of the high availability cluster is subscribed to the leader topic.

17. The data processing system of claim 16, wherein each cluster instance of the high availability cluster is adapted to only subscribe to the leader topic while the respective cluster instance of cluster instances elected as a leader of the high availability cluster.

18. The data processing system of claim 16, wherein the cluster instance is an elected leader for the high availability cluster.

19. The data processing system of claim 18, wherein the high availability cluster is adapted to perform a quorum to select leaders for the high availability cluster, and the high availability cluster is adapted to have a single leader at any point in time.

20. The data processing system of claim 15, further comprising:

obtaining, by a proxy, the activity request; and forwarding, by the proxy, the activity request to the message bus for processing by the high availability cluster.

* * * * *